(No Model.) 2 Sheets—Sheet 1.
W. H. WHITE.
VEHICLE HUB.
No. 473,985. Patented May 3, 1892.
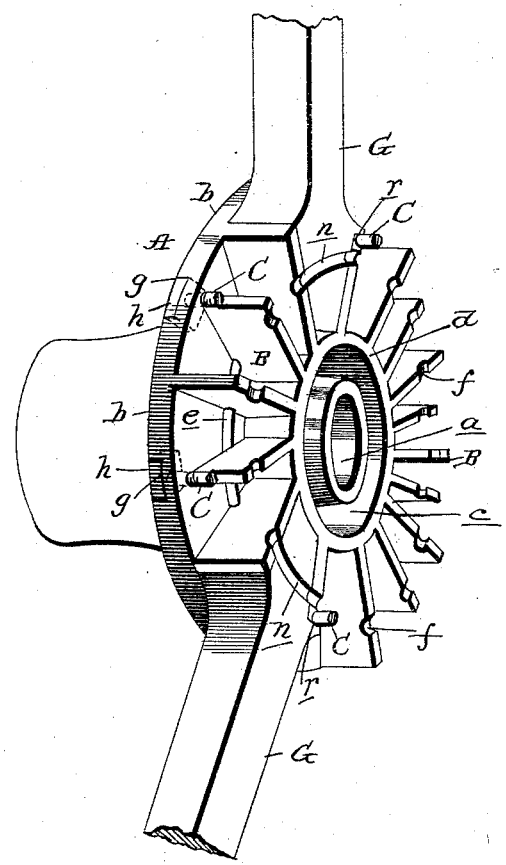
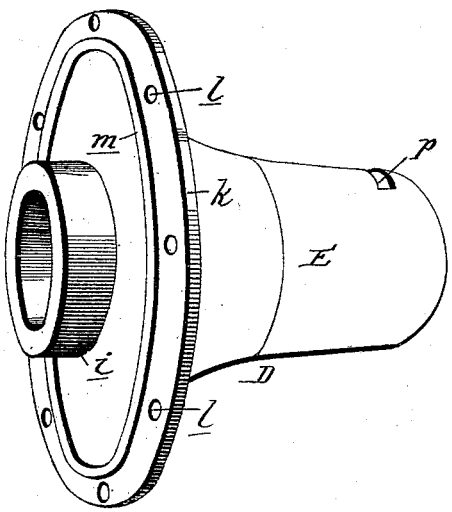
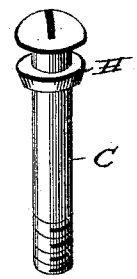
Witnesses:
H. Raeder
H. F. Matthews.
Inventor
Wells H. White
By James J. Sheehy
Attorney
THE NORRIS PETERS CO., PHOTO-LITHO., WASHINGTON, D. C.

(No Model.) 2 Sheets—Sheet 2.
W. H. WHITE.
VEHICLE HUB.
No. 473,985. Patented May 3, 1892.
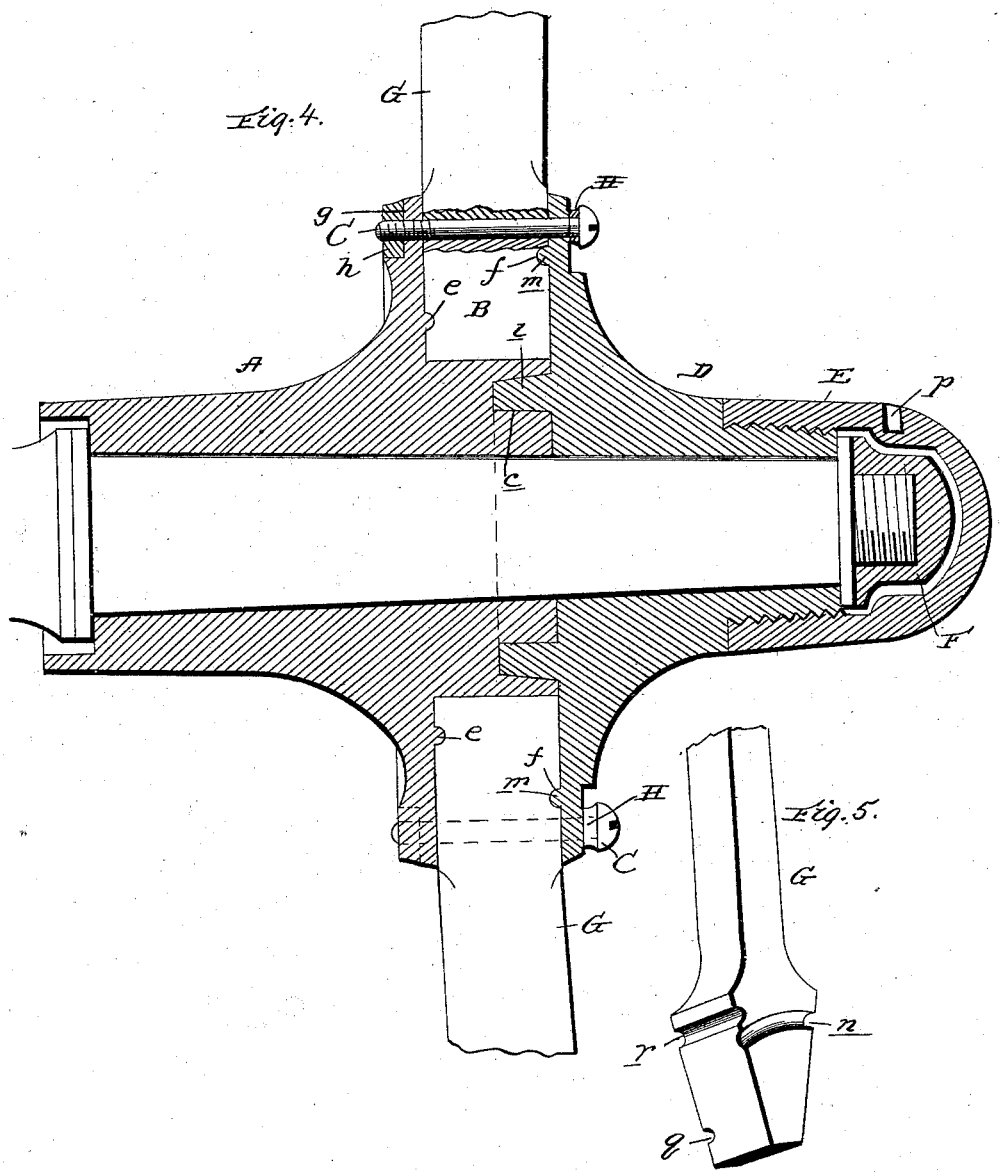

UNITED STATES PATENT OFFICE.

WELLS H. WHITE, OF LOS ANGELES, CALIFORNIA.

VEHICLE-HUB.

SPECIFICATION forming part of Letters Patent No. 473,985, dated May 3, 1892.

Application filed July 20, 1891. Serial No. 400,184. (No model.)

*To all whom it may concern:*

Be it known that I, WELLS H. WHITE, a citizen of the United States, residing at Los Angeles, in the county of Los Angeles and State of California, have invented a new and useful Carriage or Wagon Hub, of which the following is a specification.

This invention relates to improvements in carriage and wagon hubs; and among other things it has for its object to provide a hub embodying strength, lightness, simplicity, and durability; to so construct and adapt the parts for joint co-operation as to permit of the spokes or any number of them being quickly removed and replaced by others; to provide against any possibility of a spoke casually leaving its seat in the hub, and to provide connecting-bolts with springs, whereby they may be held firmly but yieldingly, so as to prevent the same from coming out.

Other objects and advantages will appear from the following description and claims when taken in connection with the annexed drawings, in which—
Figure 1 is a perspective view of the inner half or section of the hub constructed according to my improvements and illustrating a portion of two spoke seated therein. Fig. 2 is a perspective view of the outer half or section of the hub. Fig. 3 is a perspective view of one of the connecting-bolts, showing an elastic washer thereon. Fig. 4 is a longitudinal sectional view of the hubs complete with the spokes seated therein and an axle-spindle in position; and Fig. 5 is perspective view of the inner end of one of the spokes removed.

Referring by letter to said dawings, A indicates the inner section of my improved hub, which may be made of any suitable material, although I prefer to make the hub out of an alloy of cast-iron and aluminum, as by the use of such material I get the combined advantages of lightness, strength, and brightness, which is not subject to rust or the like. This hub-section A has the usual bore $a$ for the passage of an axle-spindle and an attaching or connecting flange $b$, which latter, however, differs from the ordinary flange by being a little thicker on its outside for a purpose, which will be presently explained. On the connecting or meeting side of this hub-section A and concentric with the bore $a$ is an annular groove $c$, which is of a depth so that its base will lie at a point corresponding with the longitudinal center of the spokes and their seats, and this groove is surrounded by a wall $d$, upon which the inner ends of the spokes are designed to rest. Radiating from this base or rest $d$ are walls or partitions B, which, of course, are formed integral with said hub-sections, and each alternate wall is of a corresponding height to receive above it the connecting-bolts C.

Formed on the inner side of the flange $b$ is a continuous rib or projection $e$, which is preferably beveled, as shown, although it may be shaped according to the fancy or dictation of the mechanic. The partitions or walls B are respectively provided with notches $f$, which are disposed in the same circular plane, so that a line drawn through them will form a complete circle, and are designed to receive a rib or projection on the opposite or outer section of the hub.

The flange $b$ of the hub-section A is provided on its outer side and at points corresponding with the tops of the short walls B with angular depressions or recesses $g$, which are designed to receive and seat nuts $h$ on the threaded ends of the connecting-bolts C. These bolts C are designed to take through holes in said angular recesses $g$ and pass over the outer transverse edge of the walls B, so as to project laterally therefrom and enter a groove in one of the walls or sides of the spoke, as will be presently explained.

D indicates the opposite or outer section of the hub. This section, which also has the usual bore to receive the spindle, is provided on its inner side with an annular tongue $i$, which is designed to enter the groove $c$ in the opposite section, as shown. This section D is furthermore provided with the connecting-flange $k$, having holes $l$ to receive the connecting-bolts C, and it is also provided on its inner side with an annular rib or projection $m$, designed to enter the notches $f$ of the walls B in the opposite hub-section and also enter a groove $n$ in one side of the inner end of the spokes and a screw threaded externally at its outer end to receive an internally-screw-tapped cap E, which cap is provided with a notch $p$ to receive a wrench or other implement, whereby it may be turned on or off of the hub, and this cap incloses a nut F on the outer end of the spindle, as shown.

G indicates the spokes, which are mainly of the ordinary construction, having their inner ends shaped to enter the spaces between the walls B. The inner ends of the spokes are provided on one side with a groove $q$ to receive the rib $e$ of the section A and on the opposite side, but at a greater altitude, with a similar curved groove $n$ to receive the rib $m$ of the section B, and said spokes are furthermore provided on another wall and relatively at right angles to the grooves $n$ and $q$, but at a still greater elevation, with a groove $r$, designed to receive a portion of the connecting-bolts C.

In connecting the two sections of the hub after the spokes have been seated I provide the bolts C with rubber or other elastic washer H, placed beneath the heads of the bolts, as shown, so that the said bolts may be turned into the nuts $h$ while in their angular seats, and thereby connect the two sections of the hub firmly but yieldingly and prevent the nuts from casually turning off of the bolts.

From the construction described and illustrated it will be seen that I have a very strong and durable hub and that the spokes, while being capable of quick and ready removal and replacement, are absolutely prevented from leaving their seats, being held upon opposite sides by the respective ribs of the hub-sections and on one of the remaining sides by the connecting-bolts, so as to firmly lock them in their seats.

In use should any one or more of the spokes become broken or injured it is simply necessary to turn off the cap, then loosen the connecting-bolts, and slide the sections or hubs apart, when the impaired spoke may be driven out and another one as quickly inserted.

While I have described specifically and in detail the construction precisely as shown, yet I do not wish to be understood as confining myself to such exact construction, as I am aware that some changes and modifications may be made in the parts without departing from the principle of the invention, and I therefore reserve the right to make such modifications as may fairly fall within the scope of my improvements.

Having described my invention, what I claim is—

1. A wagon or carriage hub comprising two sections, one of which is provided on its inner side with a rib or projection, and walls forming chambers or seats for spokes and having notches in one edge, said section also having bolt-apertures, with angular seats in its flange and a groove around its bore, and the opposite section having a tongue adapted to enter said groove and a rib to enter the notches in said walls and also having holes to receive the connecting-bolts, the whole being adapted to receive the inner ends of spokes and enter grooves in three outer walls thereof, substantially as specified.

2. In a wagon or carriage hub, the combination, with two sections adapted to receive and seat spokes between them, of bolts connecting said sections, elastic or yielding washers interposed beneath the heads of the bolts, and nuts arranged in angular seats on the outer side of one of the hub-sections to receive the threaded ends of the connecting-bolts, substantially as specified.

3. A carriage or wagon hub formed in two sections and having spoke-seats, in combination with spokes having a groove in one wall and bolts adapted to serve the twofold function of connecting the hub-sections and securing the spokes by entering said groove thereof, substantially as specified.

4. In a carriage or wagon hub having each short alternate spoke-seat walls of a corresponding height, in combination with an opposite section having its flange provided with bolt-holes, and connecting-bolts passing through the holes in the respective flanges above the short walls and projecting laterally therefrom, so as to enter a groove in the spoke-seats, substantially as specified.

5. In a hub, the inner section having the angular nut-seats in the outer side of its flange, the alternating long and short walls on its inner side and each wall having a notch in its inner edge at a corresponding point, and the flanges also having a rib or projection on its inner side between each wall, in combination with an outer section having bolt-holes in its flange and a continuous rib or projection on its inner side to enter the notches of said walls and connecting-bolts arranged over the outer edges of the short walls, and spokes having three side walls grooved to receive the ribs and connecting-bolts, respectively, as set forth.

WELLS H. WHITE.

Witnesses:
E. D. SILENT,
EARL PARSONS.